United States Patent

Bauer et al.

[11] Patent Number: 6,033,022
[45] Date of Patent: Mar. 7, 2000

[54] MOTOR VEHICLE SEAT WITH A SEAT FRAME AND WITH A BACK REST, WHICH CAN BE MOUNTED ONTO THIS SEAT FRAME IN THE STATE OF COMPLETION

[75] Inventors: Heinz Bauer; Burckhard Becker; Ernst-Reiner Frohnhaus, all of Solingen; Michael Lindemann, Rheda-Wiedebruck; Christof Komeinda, Wuppertal, all of Germany

[73] Assignee: C. Rob. Hammerstein GmbH & Co. KG, Solingen, Germany

[21] Appl. No.: 09/074,980

[22] Filed: May 6, 1998

[30] Foreign Application Priority Data

May 6, 1997 [DE] Germany ............................. 197 18 838

[51] Int. Cl.[7] ................................................. B60N 2/20
[52] U.S. Cl. ...................................... 297/378.12; 297/367
[58] Field of Search ............................. 297/378.12, 367, 297/368, 369

[56] References Cited

U.S. PATENT DOCUMENTS

| | | | |
|---|---|---|---|
| 3,901,100 | 8/1975 | Iida et al. ............................. | 297/367 X |
| 3,953,069 | 4/1976 | Tamura et al. ........................ | 297/367 |
| 3,973,288 | 8/1976 | Pickles ................................ | 297/367 X |
| 4,146,267 | 3/1979 | Mori et al. ........................... | 297/367 |
| 4,634,182 | 1/1987 | Tanaka ................................ | 297/367 X |
| 4,765,681 | 8/1988 | Houghtaling et al. ................. | 297/367 |
| 4,836,608 | 6/1989 | Sugujama ............................. | 297/367 |
| 4,875,735 | 10/1989 | Moyer et al. ......................... | 297/367 |
| 4,995,669 | 2/1991 | Croft .................................. | 297/367 X |
| 5,138,744 | 8/1992 | Coggon ............................... | 297/367 X |
| 5,154,476 | 10/1992 | Haider et al. ........................ | 294/378.12 X |
| 5,322,346 | 6/1994 | Notta et al. .......................... | 297/367 |
| 5,338,093 | 8/1994 | Ikegaya et al. ....................... | 297/367 |
| 5,433,507 | 7/1995 | Chang ................................. | 297/378.12 X |
| 5,522,643 | 6/1996 | Matsuura ............................. | 297/367 |
| 5,547,255 | 8/1996 | Ito et al. .............................. | 297/367 |
| 5,558,403 | 9/1996 | Hammond et al. ................... | 297/367 X |
| 5,590,932 | 1/1997 | Olivieri ............................... | 297/367 |
| 5,718,481 | 2/1998 | Robinson ............................. | 297/367 |
| 5,722,730 | 3/1998 | McKernan ........................... | 297/367 X |
| 5,733,007 | 3/1998 | Williams ............................. | 297/367 |
| 5,733,008 | 3/1998 | Tame .................................. | 297/367 X |
| 5,788,330 | 8/1998 | Ryan .................................. | 297/378.12 |

*Primary Examiner*—Jose V. Chen
*Assistant Examiner*—Rodney B. White
*Attorney, Agent, or Firm*—Thorp Reed & Armstrong, LLP

[57] ABSTRACT

A motor vehicle seat with a seat frame (20) and with a back rest (22), which can be mounted onto this seat frame (20) in the state of completion, whereby a back rest joint (24) is provided opposite the seat frame for the adjustment of the tilting of the back rest (22), which has a first arm (26), which is allocated to the seat frame (20), and a second arm (28), which is allocated to the back rest (22), and which have an angular adjustment toward each other. A piece of fitting means, which is arranged in a centric manner to the articulated axle (30) of the back rest joint (24) effects a connection between the back rest (22) and the seat frame (20). Furthermore, a lever (32) for an unlocking device for the tilting forward motion is provided at the back rest (22). The back rest joint (24) is arranged at the back rest (22) with both its arms in the state of completion of the back rest (22). A stop motion device (50) is arranged at the seat frame (20) for the fitting of the first arm (26) on one hand, and on the other hand a clamping piece (52). The clamping piece (52) can be moved between a clamping position, in which it is flexibly prestressed and in which it fixes the first arm (26) together with the stop motion device (50), and a position of release, in which the back rest (22) can be swiveled freely and without the operation of the back rest joint (24) toward the front. At the first arm (26), an unlocking lever (36) is arranged, a) which is movably connected with the lever (32) of the unlocking device for the tilting forward motion and which can be moved by the same from a position of rest into a position of unlocking, b) in whose area of motion the clamping piece (52) is positioned and c) which pushes the clamping piece (52) on the way to the position of unlocking into its position of release.

8 Claims, 3 Drawing Sheets

MOTOR VEHICLE SEAT WITH A SEAT FRAME AND WITH A BACK REST, WHICH CAN BE MOUNTED ONTO THIS SEAT FRAME IN THE STATE OF COMPLETION

FIELD OF INVENTION

The invention relates to a motor vehicle seat with a seat frame and a back rest, which can be mounted onto the seat frame in a completed state. More particularly, a back rest joint is provided opposite the seat frame for the adjustment of the tilting of the back rest, which has a first arm, which is allocated to the seat frame, and a second arm, which is allocated to the back rest, and which have an angular adjustment towards each other. A piece of fitting, which is arranged in a centric manner to the articulated axle of the back rest joint, effects a connection between the back rest and the seat frame.

BACKGROUND OF THE INVENTION

With the motor vehicle seat according to the EP 749 868 A1, two different articulated axles are provided for the adjustment of the back rest opposite the seat frame. Both are parallel to each other. A first articulated axle is used for the normal adjustment of the back rest via a back rest joint, while the second articulated axle is used for the fast tilting forward motion of the back rest, for example to make the access of rear passengers easier. A lever for the unlocking device of the tilting forward motion is normally provided at the back rest for this purpose.

When assembling motor vehicles seats, one aims to be able to complete the assembly of the back rest and the seat frame to as great an extent as possible, and to only connect the back rest with the seat frame of a point of near completion.

One especially aims to upholster the back rest first and to then assemble it later so that the individual steps of assembling, which are necessary for the assembling of the back rest and the seat frame, is as efficient and as simple as possible. Accordingly, it is desirable to manufacture a motor vehicle seat with as few connections as possible between the back rest and the seat frame.

SUMMARY OF THE INVENTION

In view of the above, the present invention provides a motor vehicle seat of the above mentioned kind in such a way that the back rest can be efficiently mounted onto the seat frame, especially in the already upholstered state, without having to perform many individual steps of assembly.

Particularly, the present invention provides a motor vehicle seat having a lever for an unlocking device for the tilting forward motion at the back rest. The back rest joint is arranged at the back rest with both sit arms in the state of completion of the back rest. A stop motion device is arranged at the seat frame for the fitting of the first arm on one hand, and a clamping piece on the other hand. The clamping piece can be moved between a clamping position, in which it is flexibly prestressed and in which it fixes the first arm together with the stop motion device, and a position of release, in which the back rest can be swiveled freely and without the operation of the back rest joint toward the front and that at the first arm. An unlocking lever is arranged, a) which is movably connected with the lever of the unlocking device for the tilting forward motion and which can be moved by the same from a position of rest into an unlocked position, b) in whose area of motion the clamping piece is positioned, and c) which pushes the clamping piece on the way to the unlocked position into its released position.

The present invention provides a back rest that can be inserted into the seat frame at the assembly. The piece of fitting means, which is typically embodied as a bolt, especially a screw, is used for the connection of the back rest and seat frame. The first arm of the back rest joint is fixed by insertion and without any additional assembly steps. The first arm is automatically clamped between the stop motion and the clamping piece; any steps of assembly are, therefore, unnecessary. Particularly, the connection between the lever for the unlocking device for the tilting forward motion and the unlocking lever does not have to be made because the latter is arranged at the first arm and the necessary stretching connection with the lever to the unlocking device for the tilting forward motion has already been executed at the assembly of the back rest. Accordingly, a special connection of the sheathed cable or a respective linkage of bais, via which the lever for the unlocking device of the tilting forward motion effects the unlocking lever, is not needed at the assembly of the back rest and the seat frame. As a result, the assembly of the motor vehicle seat is greatly simplified, thereby reducing assembly defects and manufacturing time.

In a preferred embodiment, the seat frame has a seat carrier onto which the stop motion device and the clamping part, which fix the first arm, are provided. Furthermore, a drill hole is provided at the seat carrier, which receives the piece of fitting means, which is embodied as a bolt, especially a screw, for the connection between the back rest and the seat frame. The seat carrier is connected via a device for the seat adjustment with a longitudinal adjustment device, for example a height adjustment or an adjustment device for the height of the front edge of the seat.

In a preferred embodiment, the clamping piece is an arm that can be pivoted around an axis of the clamping piece, whose pivoting path is given by two stop motion devices. Based on the axis of the clamping piece, geometrically clear positions can be kept; it is especially possible to work in the area of the self-locking device. The flanks of the clamping piece, which are actually responsible for the clamping, can be embodied precisely. A clamping piece, which is embodied as a movable part, for example, is thereby not excluded; a pivoted clamping piece, however, has proven to be especially suitable for practical use.

In a preferred embodiment, the unlocking lever and the lever for the unlocking device for the tilting forward motion are connected with each other with a stretching connection via a sheathed cable, especially a Bowden control. The assembling of these parts is already performed when assembling the back rest, before the same is attached to the front seat frame.

It has proven to be advantageous to develop the unlocking lever with two arms. Thereby one arm is in a stretching connection with the lever for the unlocking device for the tilting forward motion, while the other arm has a peripheral cam for the combined actions with the clamping lever. The latter has a guiding flank, which is allocated to the peripheral cam. This results in simple motional operations, with parts which can be manufactured in a simple manner and secured in an efficient functioning manner.

It has proven to be advantageous to allocate the unlocking lever closer to the articulated axle of the back rest joint than the bearing surface of the stop motion device or the clamping surface of the clamping piece. Expressed in other words, the clamping surface of the clamping piece or the bearing surface of the stop motion device is positioned closer to the free end of the first arm than the unlocking lever. The latter is influenced as little as possible by this at the plug-in assembly. As a result, the sheathed cable does not lie in an incorrect adjacent position. Furthermore, assembly errors are reduced.

Finally it has proven to be especially advantageous to embody a catch nose at the clamping lever and to embody a catch hook, which is allocated to this catch nose, at the unlocking lever. When the unlocking lever is not pulled, any undesired swing out of the clamping piece into the complete position of release is avoided, as the clamping part initially hits the catch hook with its catch nose, before it reaches the complete release position. A complete release of the back rest, in such a way that the same can be tilted forward, only occurs if the lever for the unlocking device for the tilting forward motion is actually operated. Accordingly, a complete release is avoided with accelerations of the individual building components caused by an accident,.

Further advantages and characteristics of the invention derive from the other claims as the following description of two non-restrictive embodiments of the invention. These are illustrated further and described with regard to the drawings.

DETAILED DESCRIPTION OF A PREFERRED EMBODIMENT

Figure 1:
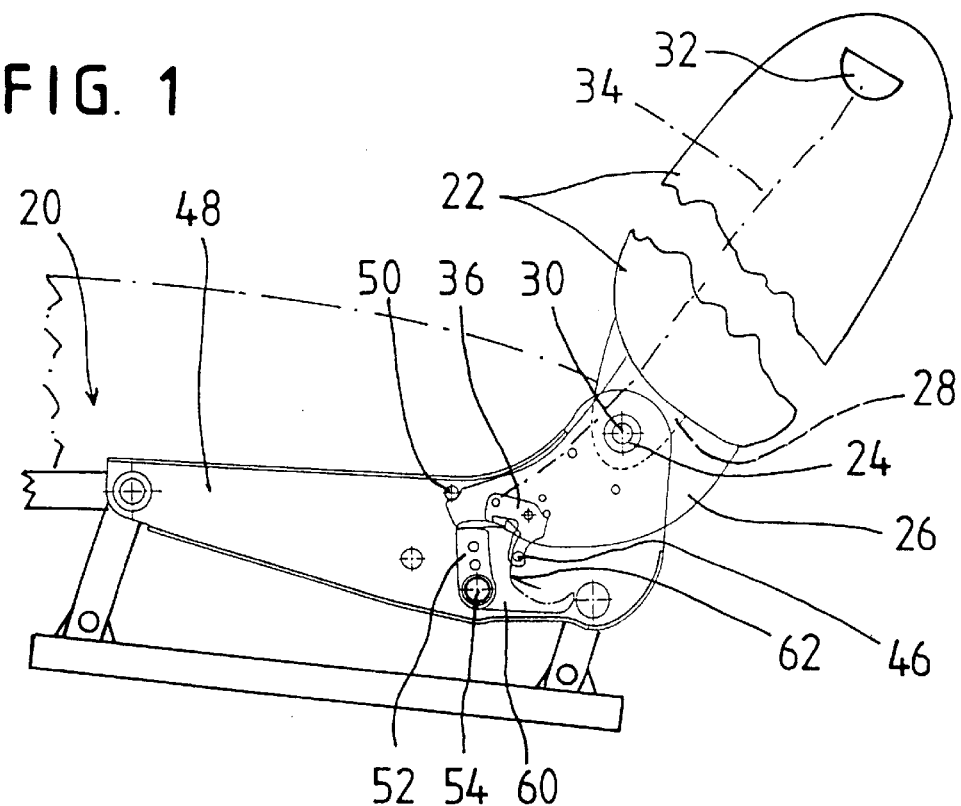
FIG. 1 is a side view of a motor vehicle seat of the present invention.
Figure 4:
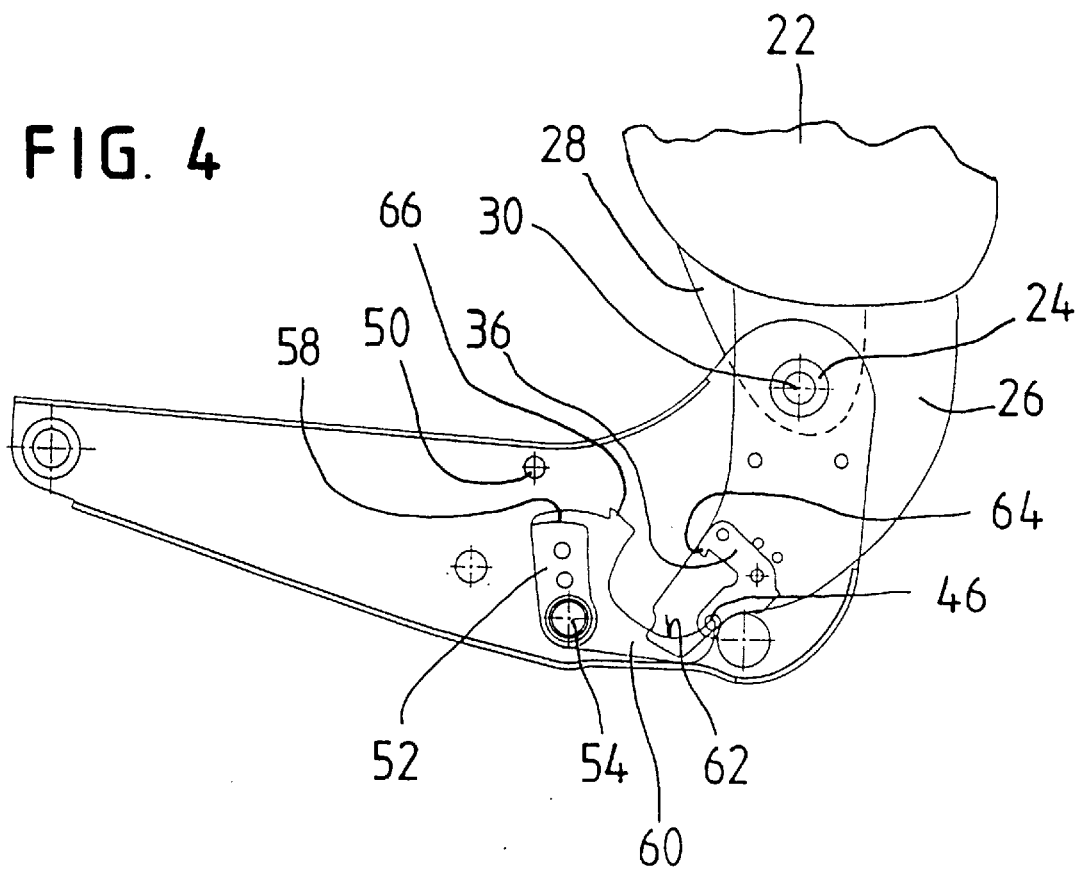
FIG. 4 is an illustration according to FIG. 3, but with the back rest in the tilted forward state.

As illustrated in FIGS. 1 and 4, the motor vehicle seat of the present invention has a seat frame 20 and a back rest 22. The latter may be mostly completed, especially already upholstered, when it is connected with the seat frame 20 by a back rest joint 24 at the back rest 22. The back rest joint 24 has a first arm 26, which is rigidly connected to a frame of the back rest 22, already at the assembly of the back rest 22, but which may especially be in one-piece with the same. The tilting of the back rest 22 is adjusted by the user into the desired position via the back rest joint 24 (which is not illustrated further at this point, but see FIG. 5), in the manner known in the art.

Furthermore, the back rest 22 may be quickly adjusted by a tilting assembly which will be explained below. The back rest 22 is tilted around the same swiveling axis as the articulated axle 30 of the back rest joint 24. But as an alternative, it is also possible to provide two different axles for the different motions of the back rest 22, as is the case with the publication mentioned previously.

Figure 2:
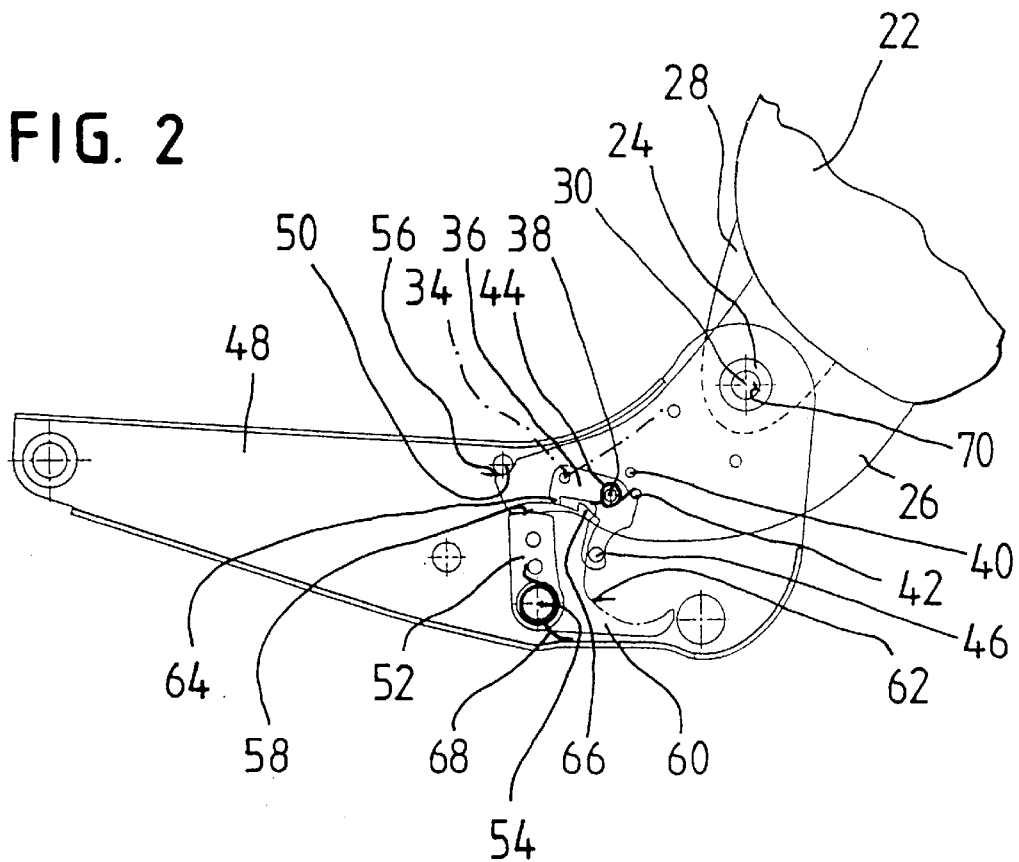
FIG. 2 is a detailed enlargement of the connecting area of the back rest and the seat carrier from the illustration according to FIG. 1, with the device for the tilting forward motion of the back rest in a locked position.

For the unlocking device for the tilting forward motion of the back rest 22, a lever 32 (FIG. 1) is provided at the same, that is positioned in the vicinity of the upper edge of the back rest 22. The lever 32 is connected in a stretching connection with an unlocking lever 36 via a sheathed cable 34, especially a Bowden control. The latter is arranged at a first arm 26 around an axis 38 in a swiveling manner, with the area of motion limited by two stop motion devices 40, 42. A piece of elastic means, preferably a leg spring 44, flexibly prestresses the unlocking lever 36 into the position as shown in FIGS. 1 and 2. When operating the lever 32, the unlocking lever 36 leaves the position of rest according to FIGS. 1 and 2. The unlocking lever 36 is embodied with two arms, one that extends to the front, as shown in FIGS. 1 and 2, onto which the sheathed cable 34 engages, and an arm extending downwardly that carries a peripheral cam 46. As can be seen in FIGS. 1 and 2, only this part of the unlocking lever 36 rises above the contour of the first arm 26, namely projects downward.

The seat frame 20 has a seat carrier 48. A stop motion device 50 is arranged to be in cooperation with the first arm 26, with a clamping piece 52 opposite thereto. The word "opposite" is used here in the sense that the front end of the first arm is positioned between the stop motion device 50 and the clamping piece 52 in the assembled state. The clamping piece 52 is embodied as a swiveling piece, it has an axis 54 of the clamping piece 52. In the assembled state, the stop motion device 50 is adjacent to a dent 56 of the first arm 26 with a bearing surface, on the opposite side a clamping surface 58 of the clamping part 52 pushes the first arm to the stop motion device 50. The respective surface of the first arm, onto which the clamping piece 52 is adjacent with its clamping surface 58, is coordinated the course of the clamping surface in such a way that an angle, which is as acute as possible, is enclosed between the two and especially that a self-locking operation is performed. The course of the clamping surface 58 may be in such a way that it initially enclosed a very acute angle with the respective course of the first arm 26 to achieve a self-locking operation; and after that, the course is slightly steeper to achieve a clamping by all means.

Figure 5:
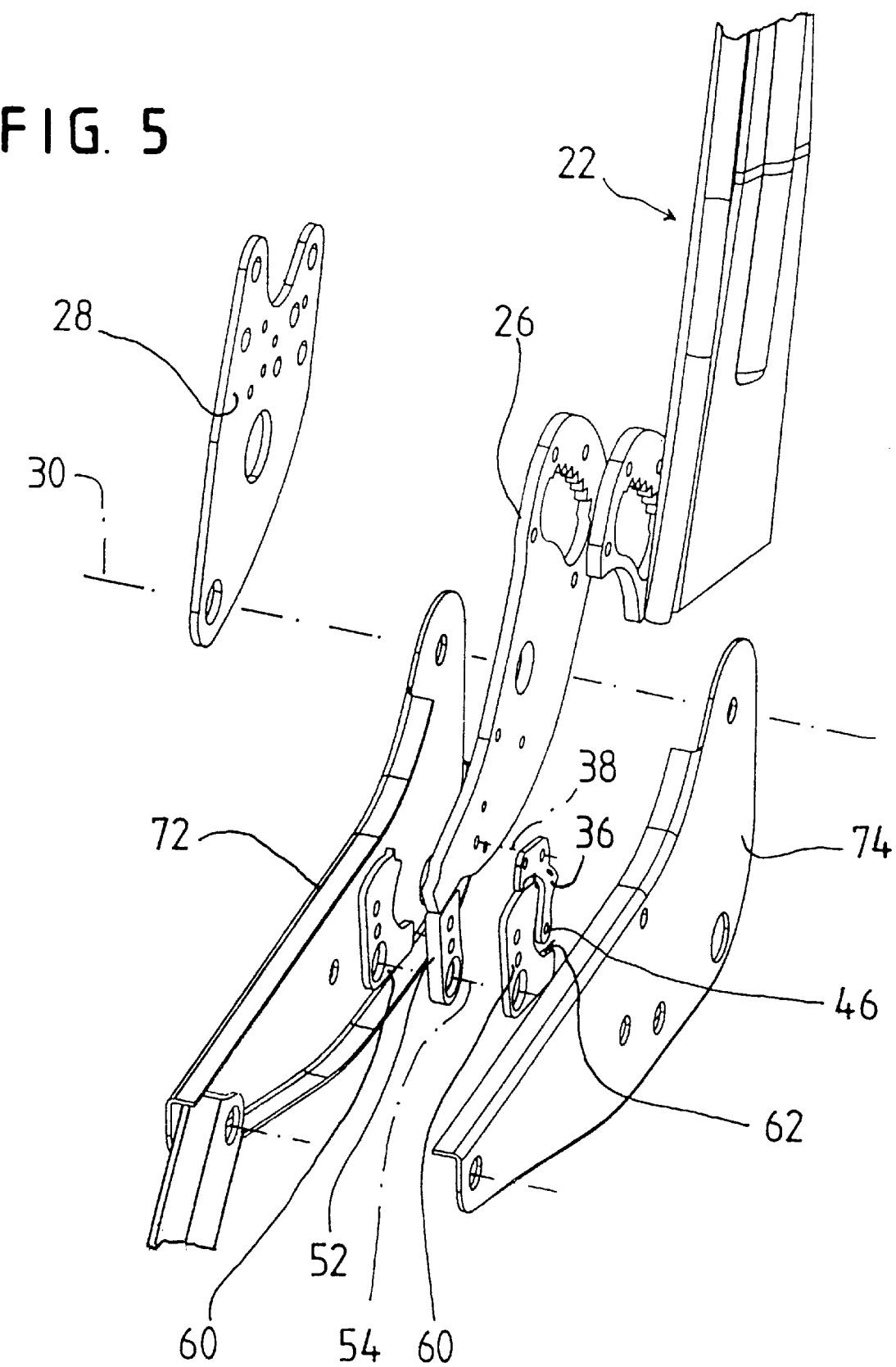
FIG. 5 is a perspective illustration in the shape of a clipping of an assembly drawing of the parts of a back rest and a seat carrier as they are illustrated in FIGS. 2 to 4.

In the illustrated embodiment, a guiding piece 60 is rigidly allocated to the clamping piece 52; both pieces may also be embodied as one piece. The guiding piece 60 embodies a guiding flank 62, and with the same the peripheral cam 46 cooperates. As illustrated in FIGS. 1 and 2, namely when the tilting of the back rest 22 is locked, the peripheral cam 46 is not yet in contact with the guiding flank 62. This contact is achieved when the unlocking lever is operated, which will be described below. The guiding piece 60 also serves the purpose of the precise guidance and allocation to the clamping piece 52 of the first arm 26, especially with two side guiding pieces 60 (FIG. 5).

Furthermore, the unlocking lever 36 has a catch nose 64, allocated to which the guiding piece 60 has a catch hook 66, at its arm, onto which the sheathed cable 34 also engages. The catch nose 64 as well as the catch hook 66 are not in contact with each other according to the FIGS. 1 and 2, but they may come into contact with each other, if by undesired forces of gravity, for example an accident, the clamping piece 52 is accelerated forward with such a force, that it could actually come completely free from the first arm 26. This complete free swiveling motion is avoided by the combined actions of the catch nose 64 and the catch hook 66.

The clamping piece 52 is flexibly prestressed in the clamping position through the use of a spring 68. The spring clip 68 always prestresses the clamping piece 52 in such a way that the clamping piece 52 attains the position according to FIGS. 1 and 2, as long as the clamping piece 52 is not stopped by the peripheral cam 46 by doing so on purpose. This is only possible, however, if the lever 32 for the unlocking device for the tilting forward motion is actively operated. The latter is a lever, which has the effect of a scanner. The lever has a position of rest, in which the unlocking lever 36 is not pulled, namely has the lever's position according to FIGS. 1 and 2. The lever can be put into the unlocking position and kept in it against the effect of a readjusting spring, then the unlocking lever 36 is swiveled out of the lever's position via a sheathed cable 34 as shown in FIGS. 1 and 2.

The individual functions operate as follows:

For the plug-in assembly the lever 32 is operated, due to that peripheral cam 46 pushes the clamping piece 52 into a position of release when pushing in the first arm 26 into the seat frame 20 and due to that a simple assembly is made possible. For the assembly, a threaded bolt is pushed through the drill hole 70 and fitted accordingly. If the lever 32 is released, then the clamping piece 52 arrives in the clamping position, and the state according to FIGS. 1 and 2 is achieved.

Figure 3:
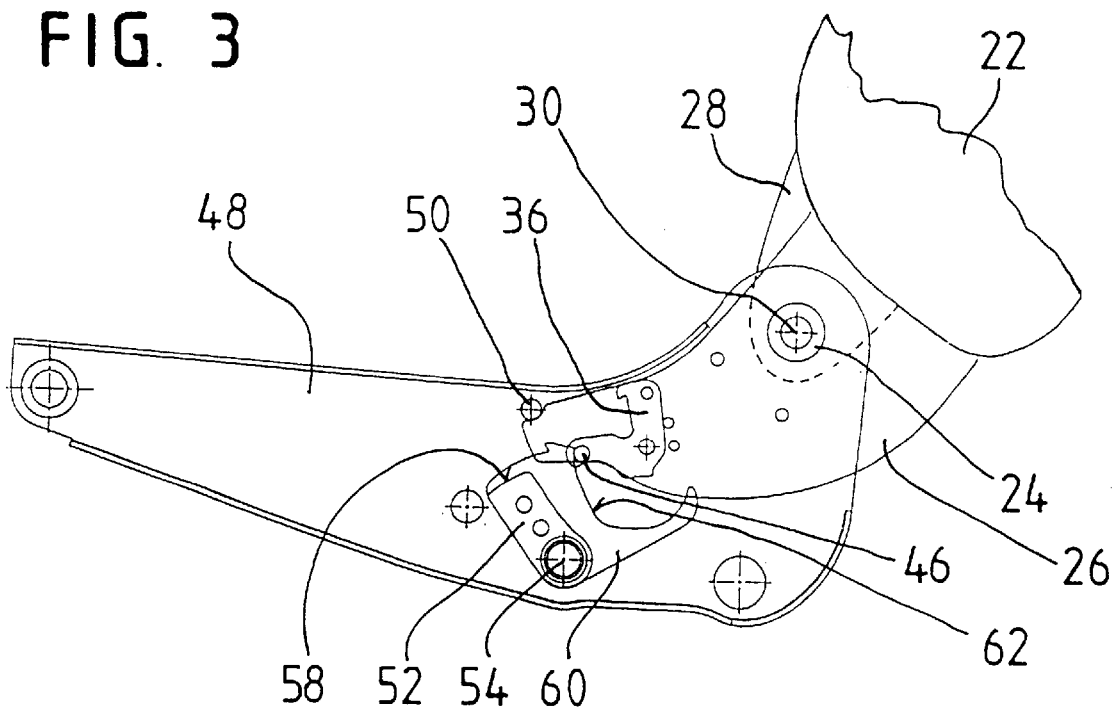
FIG. 3 is an illustration according to FIG. 2, but with the device for the tilting forward motion in the unlocked position.

If the lever 32 is operated in the practical use, then the peripheral cam 46 becomes adjacent to the guiding flank 62 and pushes the clamping piece 52 so far to the front that it is completely out of the swiveling path of the first arm around the articulated axle 30. This state is illustrated in FIG. 3. The back rest is still in its former state. According to this the peripheral cam 46 is positioned at one end, namely the upper end, of the guiding flank 62.

If the back rest 22 is tilted forward, the peripheral cam 46 slides along the guiding flank 62. This is shaped in its course in such a way that the swing-out position of the clamping piece 52 is principally kept.

With these motions the catch nose 64 is released from the catch hook 66, because of the upward swing of the arm, which projects forward, of the clamping piece 52, the catch nose 64 is not in the way of the catch hook 66 any longer.

The back rest 22 can be tilted forward up to the stop motion device. It is not necessary by all means to keep the lever 32 in the pushed state during the tilting forward motion.

If the lever 32 is released again and the back rest 22 is tilted back again, then the procedures are performed in the reverse manner, the catch nose 64 may now slide over the catch hook 66 and has enough clearance for it. The position according to the FIGS. 1 and 2 is achieved here.

The second embodiment according to FIG. 5 essentially corresponds to the embodiment according to the FIGS. 1 to 4. The joint connection, namely the embodiment of the back rest joint 24, between the first arm 26 and the second arm 28, occurs via a tooth segment in the upper final area of the side of the rest of the first arm 26; the first arm 26 is also doubled at this position. A drill hole is provided in the second arm 28, into which a pinion (not illustrated) engages, and which is in gear with the tooth segments. It can be especially driven in a motoric manner. A part of the back rest 22 is illustrated on the right of the two tooth segments.

For the plug-in process at the assembly of the back rest 22 at the seat frame 20, the front area of the first arm 26 is induced between two shells 72, 74, which enclose and store the clamping piece 52 with two guiding parts 60, which are arranged to the right and to the left. The unlocking lever 36, which is coupled to the first arm 26, is positioned on the level of the right guiding piece 60, its arm, which projects downward and carries the peripheral cam 46, has molded corners shaped in such a way that the peripheral cam 46 is adjacent to the guiding flank 62.

Although the invention has been described in detail in the foregoing for the purpose of illustration, it is to be understood that such detail is solely for that purpose and that variations can be made therein by those of ordinary skill in the art without departing from the spirit and the scope of the invention as defined by the following claims, including all equivalents thereof.

We claim:

1. A motor vehicle seat comprising:
    a seat frame comprising:
        a seat carrier having at least one stop motion device; and
        a clamping piece, said clamping piece capable of pivoting around an axis between a clamping position in which said clamping piece is flexibly pre-stressed and a position of release; and
    an upholstered back rest comprising:
        a first arm attached to an unlocking lever, the motion of said first arm being limited by said stop motion device;
        a second arm connected to a lever of an unlocking device;
        wherein said first arm of said back rest is connected to said second arm of said back rest at a back rest joint by an articulated axle; and
    wherein said unlocking lever attached to said first arm of said back rest releasably engages said clamping piece of said seat carrier when said lever of said unlocking device connected to said second arm of said backrest is operated.

2. The motor vehicle seat according to claim 1 wherein said unlocking lever and said lever for said unlocking device are connected with each other via a Bowden control.

3. The motor vehicle seat according to claim 1 wherein said unlocking lever consists of two arms, with one said unlocking lever arm being connected with a stretching connection to said lever for said unlocking device and with the other said unlocking lever arm having a peripheral cam for engagement with said clamping piece, said other unlocking lever arm comprising a control flank, which is designed to engage said peripheral cam.

4. The motor vehicle seat according to claim 1 with said unlocking lever positioned closer to said articulated axle than to a bearing surface of said stop motion device or to a clamping surface of said clamping piece.

5. The motor vehicle seat according to claim 1 wherein said clamping piece has a catch hook which releasably engages a catch nose on said unlocking lever such that when said lever for said unlocking device is not operated a complete motion into said position of release said catch nose stops at said catch hook thereby preventing release of said clamping piece.

6. The motor vehicle seat according to claim 1 wherein said seat frame includes two shells, with said clamping piece being positioned between said shells.

7. The motor vehicle seat according to claim 1 wherein said clamping piece is positioned between two guiding pieces which extend above a clamping surface of said clamping piece such that a guidance is developed for a clamping area of said first arm of said back rest.

8. The motor vehicle seat according to claim 7 wherein said two guiding pieces are positioned such that at least a section of said first arm of said back rest is positioned between said two guiding pieces in any possible position of said back rest.

* * * * *